United States Patent [19]

Termini

[11] Patent Number: 4,719,663
[45] Date of Patent: Jan. 19, 1988

[54] DETACHABLE CASTER WHEEL ASSEMBLY HAVING A FLANGE AND BOLT MECHANISM

[75] Inventor: Frank J. Termini, Elgin, Ill.

[73] Assignee: Marvel Metal Products Company, Chicago, Ill.

[21] Appl. No.: 901,834

[22] Filed: Aug. 29, 1986

[51] Int. Cl.⁴ ............................................. B60B 33/00
[52] U.S. Cl. ..................................... 16/30; 190/18 A; 280/79.1 R; 403/353
[58] Field of Search ................. 16/18 R, 29, 30, 31 R; 280/37, 79.1; 190/18 A; 403/353

[56] References Cited

U.S. PATENT DOCUMENTS 3,990,375  11/1976  Adams .............................. 403/353 X
4,026,570   5/1977  Feinberg ............................ 16/30 X
4,335,896   6/1982  Koffler et al. ....................... 16/30 X

FOREIGN PATENT DOCUMENTS 2331837  1/1975  Fed. Rep. of Germany ... 190/18 A

Primary Examiner—Fred A. Silverberg
Attorney, Agent, or Firm—Edgar A. Zarins; Malcolm L. Sutherland

[57] ABSTRACT

An assembly for detachably mounting a caster wheel to the underside of a structure such as a chair or cabinet. The assembly includes a mounting bracket which is secured to the structure and has transverse mounting slots formed in a parallel, spaced apart arrangement therein. A caster plate having a caster wheel mounted thereto is detachably secured to the bracket by depending flange members which cooperate with the mounting slots of the bracket. A mounting bolt is utilized to prevent subsequent detachment of the caster plate from the bracket once assembly is completed. The mounting bracket forms a channel and may extend along the entire width or length of the structure such that more than one caster can be mounted to the bracket.

1 Claim, 2 Drawing Figures

DETACHABLE CASTER WHEEL ASSEMBLY HAVING A FLANGE AND BOLT MECHANISM

BACKGROUND OF THE INVENTION

I. Field of the Invention

This invention relates to caster wheels for furniture structures and, in particular, to a caster wheel assembly which simplifies the manufacturing and repair process of the structure by providing a caster wheel which is readily detachable from a mounting bracket secured to the structure.

II. Description of the Prior Art

Caster wheels have been widely utilized to provide convenient movement to various structures, particularly business and home furnishings. Because of the directional rotation capabilities of the caster wheel, the wheel is convenient for use on structures which must be moved in a variety of directions. However, the past known caster wheels are secured directly to the underside of the structure thereby increasing assembly and repair costs. The conventional caster wheel generally comprises at least one wheel mounted to a vertical axis connected to the structure. In many caster wheels, the axis is not centered over the wheels thereby allowing the wheels to pivot about this axis in order to provide movement in any direction. Despite this convenience, the caster wheel is subject to breakage from extensive use and movement.

In order to provide simple replacement of the caster, various mounting methods were developed. One of the most widely utilized mountings includes a vertical post and pivot sleeve arrangement. However, because the post was slidably received within the sleeve, anytime the structure was lifted the wheel would fall from the structure. Additional means were also developed; however, none provided simple assembly and replacement of the caster wheel while maintaining the structural integrity and strength of the structure during various uses and movements.

SUMMARY OF THE PRESENT INVENTION

The present invention overcomes the disadvantages of the previous caster assemblies by providing a caster wheel which is readily assembled or repaired yet provides sufficient strength under all conditions.

The caster wheel assembly of the present invention includes a mounting bracket secured to the underside of the structure and to which may be mounted one or more of the caster wheels. The bracket has at least two mounting slots formed therein in a spaced parallel arrangement. These slots are designed to cooperate with depending flange members formed on the caster plate to which is secured the caster wheel. The flanges are formed on opposite ends of the caster plate and extend into the mounting slots to secure the caster plate to the mounting plate. These flanges comprise a pair of perpendicular flanges which extend into a corresponding linearly aligned pair of slots in the bracket and a pair of L-shaped flanges which extend into another pair of linearly aligned slots. The outwardly extending portion of the L-shaped flanges extend beneath the wall of the mounting bracket to prevent the caster plate from falling from the bracket. A threaded bolt is also provided to fixedly secure the caster plate to the mounting bracket.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which the reference characters refer to like parts throughout the views, and in which.

DETAILED DESCRIPTION OF A PREFERRED EMBODIMENT OF THE PRESENT INVENTION

Figure 1:
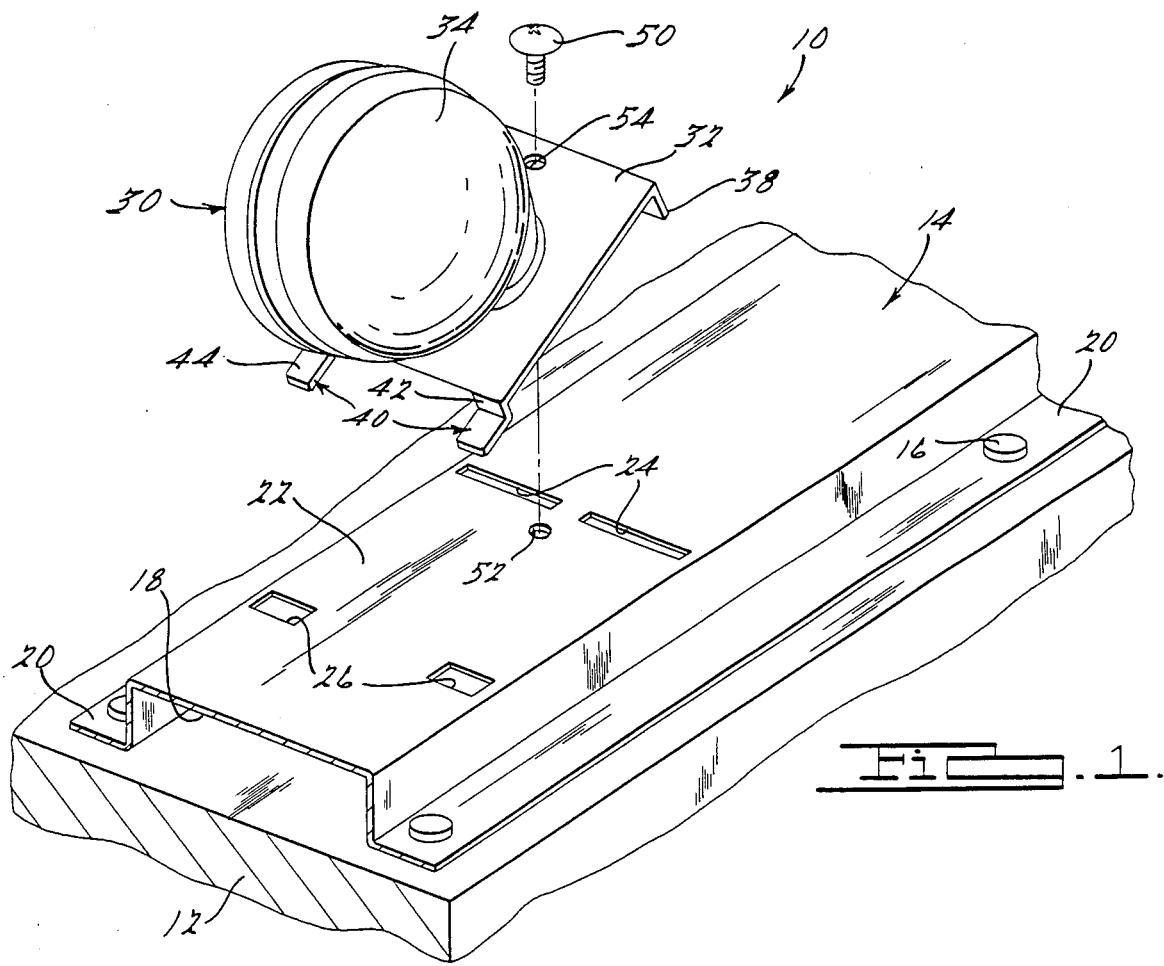
FIG. 1 is an exploded perspective view of a preferred embodiment of the present invention.
Figure 2:
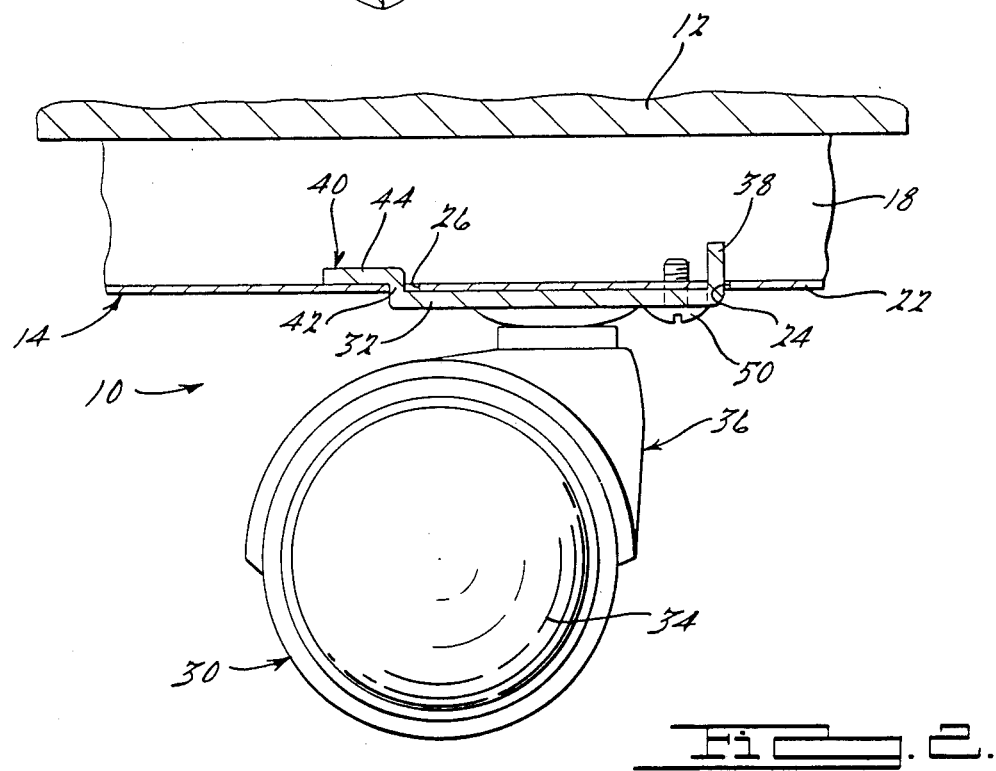
FIG. 2 is a cross-sectional view of the present invention fully assembled.

Referring generally to FIGS. 1 and 2, a caster wheel assembly 10 embodying the present invention is there shown mounted to a structure 12. It is to be understood that the assembly 10 is preferably secured to the underside of business and domestic furnishings which require either frequent or occasional moving such as a chair, cabinet or the like. Essentially, the assembly 10 may be secured to any structure which must be moved with relative ease and cannot be readily lifted.

As is shown in FIG. 1, the assembly 10 includes a mounting bracket 14 which is secured to the structure 12 by any conventional means such as screws or rivets 16. The bracket 14 forms a channel 18 with the structure 12 and includes opposing flanges 20 which facilitate the mounting of the bracket 14 to the structure 12. Formed in the wall 22 of the bracket 14 are at least two spaced parallel mounting slots 24 and 26. In the preferred embodiment shown in FIG. 1, the slots 24 and 26 comprise pairs of linearly aligned slots which extend substantially across the wall 22 of the bracket 14. However, only one transverse slot may be provided in each instance in order to accommodate a plurality of constructions.

Referring now to FIGS. 1 and 2, a caster 30 is fixedly secured to a caster plate 32. The caster 30 generally includes at least one caster wheel 34 which is rotatively mounted to a vertical axis 36. The axis 36, in turn, is secured to the caster plate 32 in a known manner. The caster plate 32 has at least two depending flanges 38 and 40 extending from opposite sides of the plate 32. Preferably, the opposing flanges are divided into a first pair of flanges 38 extending perpendicular to the plate 32 and a second pair of L-shaped flanges 40 formed at a right angle to the plate 32. The L-shaped flanges 40 include a first member 42 extending perpendicular to the plate 32 and a second member 44 extending outwardly from the first member 42. The second member 44 of the flange 40 is disposed substantially parallel to the caster plate 32.

The positioning and spacial relationship of the flanges 38 and 40 is directly related to the positioning of the slots 24 and 26, respectively. Moreover, the flanges 38 and 40 are substantially equal in cross-sectional dimension to the cross-sectional dimension of the corresponding pair of mounting slots 24 and 26. In assembling the device, the L-shaped flanges 40 are placed through the second pair of slots 26 while the perpendicular flanges 38 are placed through the first pair of slots 24 as shown in FIG. 2. When both sets of flanges are disposed within the corresponding slots, the outwardly extending portions 44 of the flanges 40 extend beneath and parallel to the wall 22 of the bracket 14. Thus, flanges 40 are prevented from being removed from the slots 26 without first removing the flanges 38 from the slots 24.

Once the caster plate 32 is mounted to the bracket 14, the assembly 10 may be fixedly secured using the bolt 50 which is mounted through the axially aligned apertures 52 and 54 formed in the bracket 14 and the caster plate 32, respectively. With the bolt 50 disposed through the apertures as shown in FIG. 2, the flanges 38 are prevented from being removed from their slots 24. Thus, the caster 30, after being easily mounted to the bracket 14 and the structure 12, is fixedly secured into position yet can be readily replaced or removed if necessary.

Although the present invention has been described with only one caster 30 mounted to the bracket 14, it should be readily understood that the bracket 14 may extend the entire length or width of the structure 12 such that more than one of the casters 30 can be mounted along the bracket 14. Moreover, although the caster assembly 10 is described as being secured by the bolt 50 other means may be utilized or the bolt eliminated altogether such that the weight of the structure 12 maintains the position of the assembly 10.

The foregoing detailed description has been given for clearness of understanding only and no unnecessary limitations should be understood therefrom as some modifications will be obvious to those skilled in the art without departing from the scope of the claims.

I claim:

1. An assembly for detachably mounting a caster wheel to the underside of a structure, said assembly comprising:

an elongated, channel-shaped mounting bracket fixedly secured to the underside of the structure, said mounting bracket including a first pair of linearly aligned mounting slots extending across said bracket and having a first surface therebetween and a second pair of linearly aligned mounting slots extending across said bracket, said first and second pairs of mounting slots formed in transverse parallel alignment, a first throughbore formed in said bracket adjacent the first surface;

an integral caster plate having a first pair of integral flange members formed perpendicular to said caster plate along a first edge of said plate and having a second surface therebetween and a second pair of integral L-shaped flange members formed along a second opposite edge of said plate, said first flange members cooperating with said first mounting slots and said second flange members cooperating with said second mounting slots to detachably secured said caster plate in adjacent flush relation to said mounting bracket, said L-shaped flange members including an outwardly extending portion disposed parallel to said caster plate which underlies and abuts said mounting bracket upon insertion into said second mounting slots upon assembly, a second throughbore formed in said caster plate adjacent said second surface, said first and second throughbores being aligned with each other after assembly;

a caster wheel pivotably and rotatably mounted to said caster plate; and means for fixedly securing said caster plate to said mounting bracket, said means including at least one mounting bolt which extends through said aligned throughbores.

* * * * *